(12) United States Patent
Sridharan et al.

(10) Patent No.: US 9,772,793 B2
(45) Date of Patent: Sep. 26, 2017

(54) DATA BLOCK MOVEMENT OFFLOAD TO STORAGE SYSTEMS

(71) Applicant: Oracle International Corporation, Redwood Shores, CA (US)

(72) Inventors: Vijay Sridharan, Santa Clara, CA (US); Alexander Tsukerman, Foster City, CA (US); Jia Shi, Burlingame, CA (US); Kothanda Umamageswaran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/490,367

(22) Filed: Sep. 18, 2014

(65) Prior Publication Data
US 2015/0089140 A1   Mar. 26, 2015

Related U.S. Application Data (60) Provisional application No. 61/880,653, filed on Sep. 20, 2013, provisional application No. 62/016,559, filed on Jun. 24, 2014.

(51) Int. Cl.
*G06F 12/00* (2006.01)
*G06F 3/06* (2006.01)
*G06F 12/0875* (2016.01)

(52) U.S. Cl.
CPC .............. *G06F 3/065* (2013.01); *G06F 3/061* (2013.01); *G06F 3/067* (2013.01); *G06F 3/0619* (2013.01); *G06F 3/0659* (2013.01); *G06F 3/0689* (2013.01); *G06F 12/0875* (2013.01); *G06F 2212/313* (2013.01)

(58) Field of Classification Search
USPC .......................................... 711/103, 162, 144
See application file for complete search history.

(56) References Cited

U.S. PATENT DOCUMENTS

| 4,425,615 A | 1/1984 | Swenson et al. |
| 5,717,893 A | 2/1998 | Mattson |
| 5,774,643 A | 6/1998 | Lubbers |

(Continued)

FOREIGN PATENT DOCUMENTS

| GB | 2409 301 A | 6/2005 |
| WO | WO 93/18461 | 9/1993 |

OTHER PUBLICATIONS

U.S. Appl. No. 13/785,557, filed May 31, 2012, Final Office Action, dated Sep. 22, 2014.

(Continued)

*Primary Examiner* — Mardochee Chery
(74) *Attorney, Agent, or Firm* — Hickman Palermo Becker Bingham LLP (57) ABSTRACT

In a write by-peer-reference, a storage device client writes a data block to a target storage device in the storage system by sending a write request to the target storage device, the write request specifying information used to obtain the data block from a source storage device in the storage system. The target storage device sends a read request to the source storage device for the data block. The source storage device sends the data block to the target storage device, which then writes the data block to the target storage device. The data block is thus written to the target storage device without the storage device client transmitting the data block itself to the target storage device.

21 Claims, 5 Drawing Sheets

(56) References Cited

U.S. PATENT DOCUMENTS

| | | |
|---|---|---|
| 6,457,105 B1 | 9/2002 | Spencer et al. |
| 6,728,823 B1 | 4/2004 | Walker et al. |
| 6,922,754 B2 | 7/2005 | Liu et al. |
| 7,069,324 B1 | 6/2006 | Tiwana et al. |
| 7,159,076 B2 | 1/2007 | Madter |
| 7,165,144 B2 | 1/2007 | Choubal et al. |
| 7,290,090 B2 | 10/2007 | Madter |
| 7,461,147 B1 | 12/2008 | Mowat et al. |
| 7,506,103 B2 | 3/2009 | Madter |
| 7,636,814 B1 | 12/2009 | Karr et al. |
| 7,836,262 B2 | 11/2010 | Gunna et al. |
| 7,904,562 B2 | 3/2011 | Takase et al. |
| 8,244,984 B1 | 8/2012 | Glasco et al. |
| 8,327,080 B1 | 12/2012 | Der |
| 8,359,429 B1 | 1/2013 | Sharma et al. |
| 8,370,452 B2 | 2/2013 | Harvell et al. |
| 2004/0117441 A1 | 6/2004 | Liu et al. |
| 2004/0148486 A1 | 7/2004 | Burton |
| 2004/0225845 A1 | 11/2004 | Kruckemyer et al. |
| 2004/0254943 A1 | 12/2004 | Malcom |
| 2005/0160224 A1 | 7/2005 | Cuomo et al. |
| 2005/0193160 A1 | 9/2005 | Bhatte et al. |
| 2005/0210202 A1 | 9/2005 | Choubal et al. |
| 2006/0064441 A1 | 3/2006 | Yamamoto |
| 2006/0106890 A1 | 5/2006 | Paul et al. |
| 2007/0067575 A1 | 3/2007 | Morris et al. |
| 2007/0260819 A1 | 11/2007 | Gao et al. |
| 2008/0016283 A1 | 1/2008 | Madter |
| 2008/0046736 A1 | 2/2008 | Arimilli et al. |
| 2009/0193189 A1 | 7/2009 | Carswell et al. |
| 2009/0248871 A1 | 10/2009 | Takase et al. |
| 2010/0017556 A1 | 1/2010 | Chin et al. |
| 2010/0122026 A1 | 5/2010 | Umamageswaran et al. |
| 2011/0022801 A1 | 1/2011 | Flynn |
| 2011/0173325 A1 | 7/2011 | Cherian et al. |
| 2011/0191543 A1 | 8/2011 | Craske et al. |
| 2011/0258376 A1 | 10/2011 | Young |
| 2013/0086330 A1 | 4/2013 | Baddepudi |
| 2013/0212332 A1 | 8/2013 | Umamageswaran |
| 2013/0326152 A1 | 12/2013 | Loaiza et al. |
| 2014/0108751 A1 | 4/2014 | Brown et al. |

OTHER PUBLICATIONS

U.S. Appl. No. 13/288,785, filed Nov. 3, 2011, Final Office Action, dated Jan. 5, 2015.

U.S. Appl. No. 13/485,557, filed May 31, 2012, Notice of Allowance, dated Feb. 11, 2015.

Baddepudi, U.S. Appl. No. 13/288,785, filed Nov. 3, 2011, Office Action, dated Dec. 30, 2016.

Oracle, Help Center, "Database Installation Guide", 3 Oracle Grid Infrastructure for a Standalone Server, dated 2016, 29 pages.

Oracle, Automatic Storage Management Administrator's Guide, 1 Introduction to Oracle Automatic Storage Management, dated 2016, 12 pages.

Oracle Database, "Oracle Real Application Clusters (RAC)", An Oracle White Paper, dated Jun. 2013, 23 pages.

Nanda, Arupa, "Oracle Exadata: Smart Scans Meet Storage Indexes", dated May 2011, 4 pages.

An Oracle White Paper, "A Technical Overview of the Oracle Exadata Database Machine and Exadata Storage Server", dated Jun. 2012, 36 pages.

U.S. Appl. No. 13/288,785, filed Nov. 3, 2011, Interview Summary, dated Oct. 25, 2016.

U.S. Appl. No. 13/288,785, filed Nov. 3, 2011, Final Office Action dated May 6, 2016.

DATA BLOCK MOVEMENT OFFLOAD TO STORAGE SYSTEMS

CROSS-REFERENCE TO RELATED APPLICATIONS; BENEFIT CLAIM

This application claims priority to U.S. Provisional Application No. 61/880,653, entitled "Intelligent Storage Data Validation And Movement For Host Based Volume Managers", filed by Vijay Sridharan on Sep. 20, 2013, the contents of which are incorporated herein by reference, and claims priority to U.S. Provisional Application No. 62/016,559, entitled "Movement Offload To Storage Systems", filed by Vijay Sridharan, et al. on Jun. 24, 2014, the contents of which are incorporated herein by reference.

This application is related to U.S. application Ser. No. 13/485,557, entitled Rapid Recovery From Loss Of Storage Device Cache, filed on May 31, 2012 by Juan R. Loaiza, et al., the contents of which are incorporated herein by reference.

This application is related to U.S. application Ser. No. 13/288,785, entitled Write-Back Storage Cache Based On Fast Persistent Memory, filed on Nov. 3, 2011 by Bharat Chandra Baddepudi, et al., the contents of which are incorporated herein by reference.

FIELD OF THE INVENTION

The present invention relates to data storage devices.

BACKGROUND

In a storage management system, one or more storage device clients store data in storage devices. Storage devices are typically block mode devices. A block mode device provides a storage device client access to data in units referred to as a data block. A data block is an atomic unit of data from primary storage that a storage device client may request from a storage device.

To ensure availability of data on a storage device when that storage device fails or otherwise becomes unavailable, storage management systems use data mirroring. In data mirroring, a set of data is stored redundantly in a set of storage devices referred to as a mirrored set of storage devices or a mirrored set. Data stored on a storage device in a mirrored set is stored redundantly on other storage devices in the mirrored set. Storage devices in a mirrored set are referred to herein as mirror peers with respect to each other. Data mirroring ensures that when mirrored data on a storage device becomes unavailable on that storage device, a redundantly stored copy may be obtained from at least one mirror peer.

Figure 1:
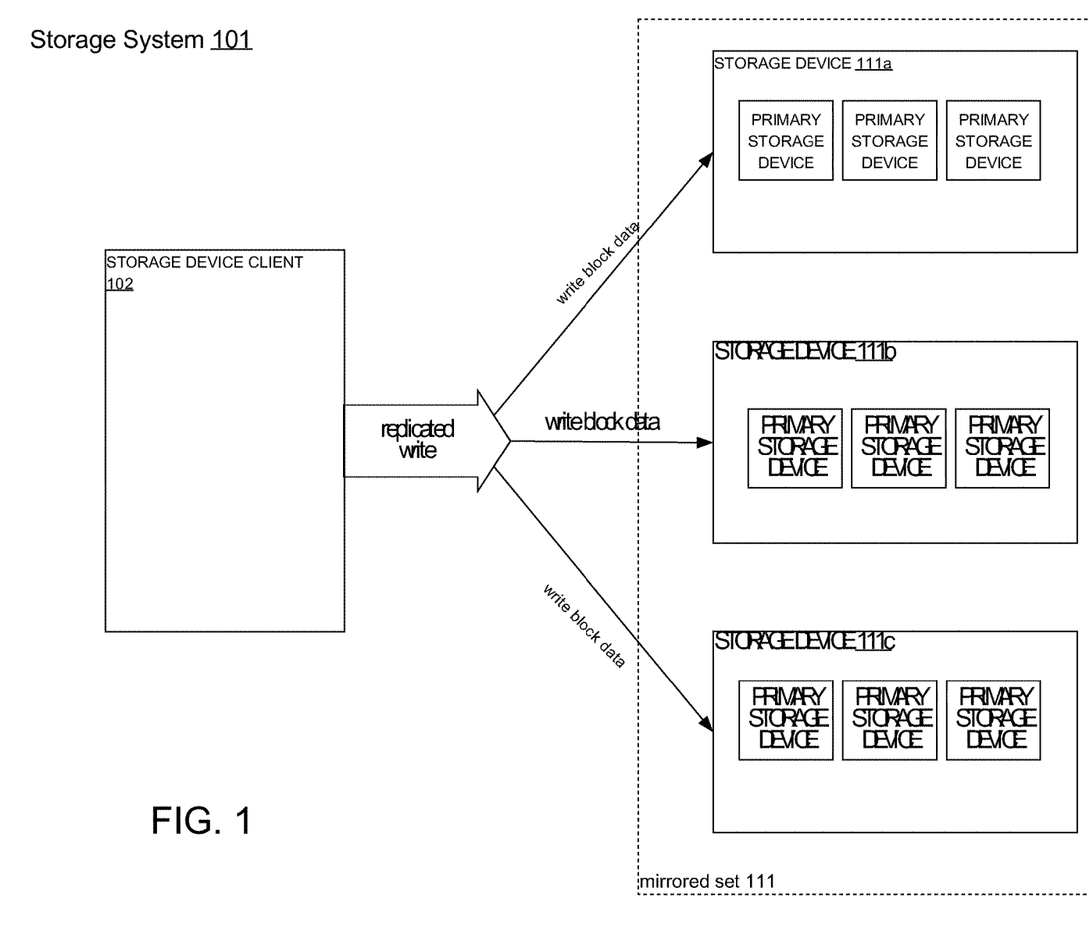
FIG. 1 is a drawing depicting a storage system according to an embodiment of the present invention.

FIG. 1 is a block diagram depicting an illustrative Storage System 101 that uses data mirroring. Storage System 101 comprise storage device client 102 and storage device 111a, storage device 111b, and storage device 111c, and other storage devices not depicted. Storage device 111a, storage device 111b, and storage device 111c comprise mirrored set 110, storing and mirroring a set of data blocks. Each of storage device 111a, storage device 111b, and storage device 111c comprises primary storage devices for persistently storing data blocks. A primary storage device may be a disk-based device, a flash memory device, or other form of persistent memory. For a mirrored data block that is stored in a primary storage device of any of storage device 111a, storage device 111b, and storage device 111c, a copy of the data block is stored in a primary storage device of another of storage device 111a, storage device 111b, and storage device 111c.

Data mirroring entails performing and participating in various kinds of core data mirroring operations. Among such operations are replicated writes, re-synchronization, and rebalancing.

In a replicated write, when a storage device client writes a data block, the data block is concurrently written to all the mirror peers for that data block. A replicated write of a data block is not considered complete until the storage device client receives acknowledgement that each of the mirror peers has written the data block.

An approach for performing a replicated write is illustrated using mirrored set 111. To execute a replicated write, storage device client 102 issues a write request for a data block to each mirror peer of mirrored set 111, transmitting the data to write for the data block to each of storage device 111a, storage device 111b, and storage device 111c. Each of storage device 111a, storage device 111b, and storage device 111c writes the data block and transmits acknowledgement of the write to storage device client 102. When a storage device writes a data block, the data block is persistently stored. Once storage device client 102 receives acknowledgement of the requested write from each of storage device 111a, storage device 111b, and storage device 111c, the write is considered committed.

In re-synchronization, a "target" mirror peer is synchronized with other mirror peers in a mirrored set. The re-synchronization may be performed as a result of mirror peer failure. The re-synchronization is performed to bring a failed mirror peer or replacement mirror peer online and in-synch with other mirror peers of the mirrored set.

Re-synchronization may be performed using client-read-writes. In a client-read-write, a storage device client issues a read request for a data block to a source storage device. The storage device transmits the requested data block to the storage device client. Once received, the storage device client writes the data block to the target storage device, transmitting the data block to write to the target storage device.

In rebalancing, a set of data blocks is moved between storage devices to rebalance I/O load between storage devices of a storage system. For example, to reduce I/O load on a storage device for a set of data blocks, the storage device is removed from the mirrored set for the set of data blocks and replaced by a new mirror peer within the mirrored set. To accomplish this switch, the set of data blocks is written to the new storage device using the client-read-write approach, where the source storage device is a member of the mirrored set and the new storage device is the target storage device.

The efficiency with which replicated writes, re-synchronization, and rebalancing are performed is important to the performance of data mirroring. Described herein in are approaches for performing these operations more efficiently.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein is an approach to writing to storage devices in a storage system referred to herein as write by-peer-reference. In a write by-peer-reference, a storage device client writes a data block to a target storage device in the storage system by sending a write request to the target storage device, the write request specifying information used to obtain the data block from a source storage device in the storage system. The target storage device sends a read request to the source storage device for the data block. The source storage device sends the data block to the target storage device, which then writes the data block to the target storage device. The data block is thus written to the target storage device without the storage device client transmitting the data block itself to the target storage device.

As compared to a client read-write, a write by-peer-reference transmits the data block from the source storage device to the target storage device without having to transmit the data block to or from the storage device client. This allows various data mirroring operations to be performed more efficiently and/or more quickly.

For example, for re-synchronization, data blocks are copied to a new mirror peer without transmitting the data blocks to the storage device client. By eliminating this "one leg" in the transmission of the data block, data blocks may be copied more quickly. In addition, network traffic between the storage device client and storage devices in the storage system is reduced.

In a replicated write, a storage device client may initially write a data block to one mirror peer. Once the write is acknowledged by the one mirror peer, the storage device client issues write by-peer-reference requests to other mirror peers to in effect pull the data block from the one mirror peer. Transmission of the data block between the storage device client and the other mirror peers is avoided, thereby reducing network traffic between the storage device client and storage devices in the storage system.

Illustrative Mirrored Storage System

Figure 2:
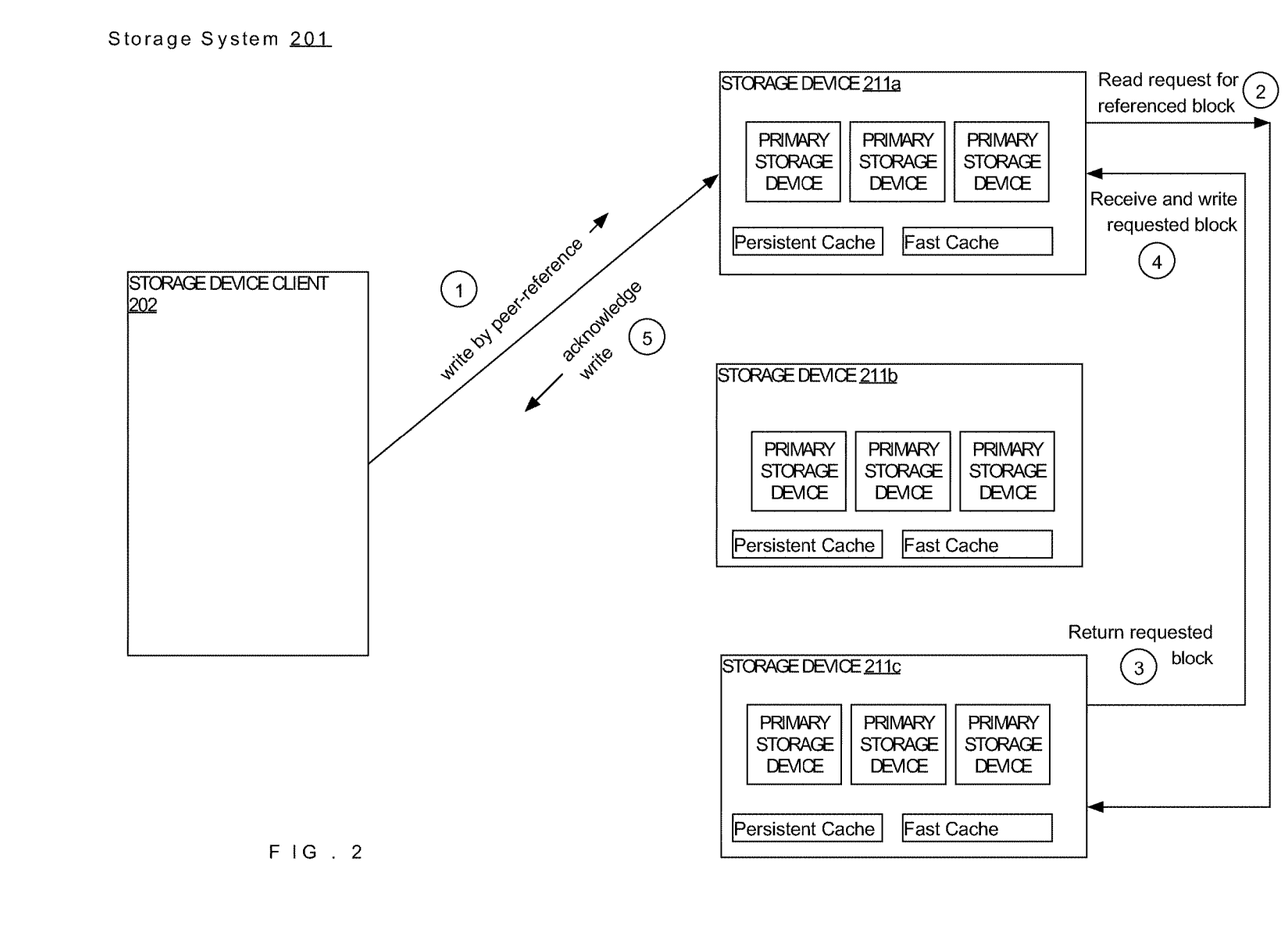
FIG. 2 is a drawing depicting a storage system according to an embodiment of the present invention.

Referring to FIG. 2, it depicts Storage System 201. Storage System 201 comprises storage device client 202 and storage devices 211a, 211b, and 211c. Storage System 201 may comprise other storage devices. An example of a storage device client is a database server, including a multi-node database server with each node running an instance of a database server and having shared access to storage devices 211a, 211b, and 211c. It should be noted that an embodiment of the present invention is not limited to database servers as storage device clients, or to any number of storage device clients.

In an embodiment, data stored by storage device client 202 on storage device 211a is mirrored on storage device 211b. Two storage devices are described herein as mirror peers within mirrored storage system 201 for purposes of exposition; however, an embodiment of the present invention is not so limited. For example, an embodiment may comprise three mirror peers for greater redundancy.

According to an embodiment, storage device 211a is a computer system complete with one or more CPUs and volatile memory. The one or more CPUs, pursuant to execution of software, manage operation of storage device 211a. Each of storage device 211a, storage device 211b, and storage device 211c comprises primary storage devices for persistently storing data blocks.

Storage device 211a is a block mode device. Data in a primary storage device in storage device 211a is organized by data blocks. A data block is associated with a data block address which uniquely identifies the data block and the data block's storage location within a storage device.

A data block's "primary block address" is an address that identifies a storage location of the data block within primary storage in a storage device. For example, primary storage may include a commodity disk drive, which exposes an address space of addresses for data blocks. A primary block address may identify a disk and address of a data block within the address space exposed by the commodity disk drive.

A storage device is configured to respond to I/O requests for a data block that specify the data block address within the request. For example, to write a data block to storage device 211a, storage device client 202 issues a write request identifying the data block to write by specifying the primary block address of the data block.

In addition, a storage device is configured to respond to I/O requests for multiple data blocks, such as a set of data blocks stored at a range of primary block addresses. For example, to read a contiguous set of data blocks from storage device 211a, storage device client 202 issues a read request that identifies a range of primary block addresses of the data blocks. Data blocks are referred to herein as contiguous or being contiguously stored when the data blocks are stored at contiguous addresses in a primary block address space.

Each of storage devices 211a, 211b, and 211c includes a fast cache and may include a persistent cache. Copies of data blocks from primary storage may be temporarily stored in the fast cache and/or persistent cache, or both.

A persistent cache in a storage device may comprise one or more non-volatile memory devices (flash memory, high speed disk drives), which may be a faster form of a memory than that of primary storage devices but less fast than the fast cache in the storage device. Fast cache may comprise volatile memory or non-volatile memory, such as PRAM (phase change random access memory) that is much faster than memory used for the persistent cache or primary cache. Generally, the storage capacity of fast cache is smaller than persistent cache, which in turn is smaller than primary storage.

According to an embodiment of the present invention, data blocks are stored in persistent cache and fast cache in response to read and write requests for the data blocks and retained in persistent cache or fast cache to satisfy subsequent accesses to the data blocks from persistent cache or fast cache. The retention of the data blocks is governed by a cache-hit management policy. A cache-hit management policy is designed to retain data blocks in the persistent cache or fast cache that are more likely to be accessed than other data blocks in primary storage.

According to an embodiment, to write data in response to a write request from the storage device client, a storage device stages the data block in the fast cache and writes the data to primary storage and/or persistent cache. To service a read request for a data block from a storage device client, if the data block is in the fast cache, the data block is read from the fast cache and transmitted to the storage device client. Otherwise, the data block is read from primary storage or the persistent cache and is transmitted to the storage device client; the data block may also be cached in the fast cache in anticipation of subsequent reads. A decision to cache the data block in the fast cache is made pursuant to a cache-hit policy for the fast cache, which may be based on information provided by a storage device client, an of example of such information is described in the below section PINNING A SOURCE DATA BLOCK.

A copy of a data block in primary storage that is stored as a data block in persistent cache or fast cache is referred to herein as a cache copy or a cached data block.

Storage device client 202 and storage devices 211a, 211b, and 211c are interconnected to each other by a network connection. That is, storage device client 202 is connected via the network connection to each of storage devices 211a, 211b, and 211c, and each of storage devices 211a, 211b, and 211c is connected via a network connection to another of storage devices 211a, 211b, and 211c. The network connection between storage device client 202 and storage devices 211a, 211b, and 211c is preferably a high performance network communication link, such as an InfiniBand™ network communications link. Messages and data sent to service I/O requests between storage device client 202 and each of storage devices 211a, 211b, and 211c is transmitted over the network connection.

In addition, each of storage devices 211a, 211b, and 211c may issue I/O requests to another of storage devices 211a, 211b, and 211c. Similarly, messages and data sent to service I/O requests between storage devices 211a, 211b, and 211c is transmitted over the network connection.

Write by-Peer-Reference.

FIG. 2 illustrates operations and messages transmitted to perform a write by-peer-reference. Operations are labeled by circled ordinal numbers to indicate the order in which the operations are performed.

1. A storage device client issues a write by-peer-reference request to a target storage device to write a source data block from a source storage device to a target primary block address at the target storage device. The write by-peer-reference specifies the source storage device and the source primary block address of the source data block at the source storage device. In the current illustration, storage device 211a is the target storage device and storage device 211c is the source storage device. Storage device client 202 transmits a write by-peer-reference request to storage device 211a, specifying storage device 211c as the source storage device, and specifying the target primary block address and source primary block address. The write by-peer-reference is transmitted to storage device 211a over the network connection between storage device client 202 and storage device 211a.

2. In response to receiving the write by-peer-reference request from a storage device client, the target storage device transmits a read request to the source storage device specified in the write by-peer-reference request for the source data block identified by the source primary block address. In the current illustration, storage device 211a transmits a read request to read the source data block to storage device 211c, specifying the source primary block address. The read request is transmitted via the network connection between storage device 211a and storage device 211c.

3. In response to receiving the read request from the target storage device, the source storage device transmits the source data block to the target storage device. In the current illustration, storage device 211c transmits the source data block to storage device 211a. The source data block is transmitted via the network connection between storage device 211a and storage device 211c.

4. The target storage device receives the source data block transmitted from the source storage device. The target storage device writes the source data block to the target primary block address. In the current illustration, storage device 211a receives the source data block transmitted from storage device 211c via the network connection between storage device 211a and storage device 211c. Storage device 211a then writes the source data block to the target primary block address.

5. The target storage device transmits an acknowledgement to the storage device client to acknowledge that the source data block was written to the target storage device at the target primary block address.

Replicated Writes

Figure 3:
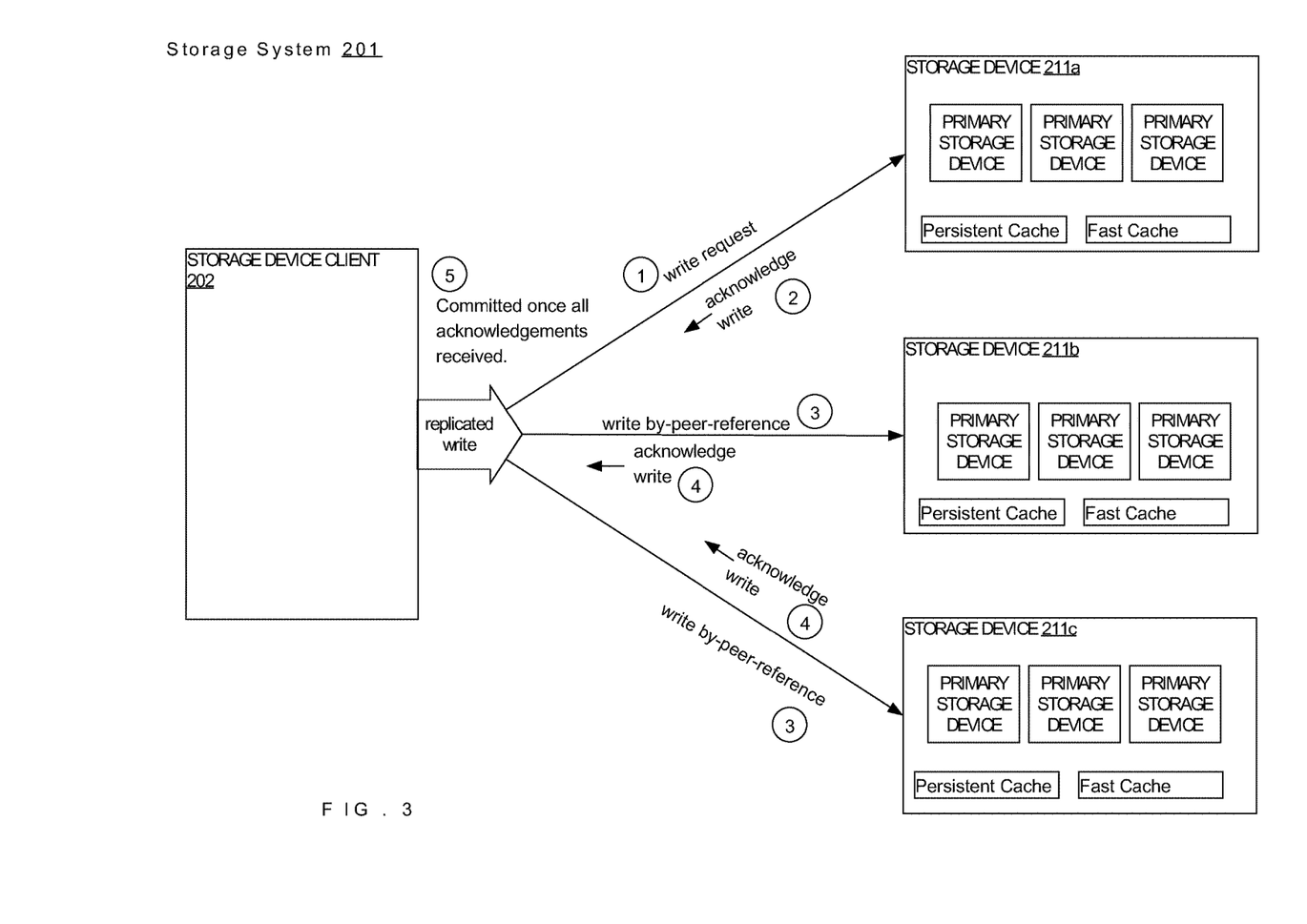
FIG. 3 is a drawing depicting a storage system according to an embodiment of the present invention.

FIG. 3 depicts an approach that employs write by-peer-reference to perform a replicated write. The approach is illustrated using Storage System 201, where source storage device, storage device 211b, and storage device 211c are mirror peers, and where storage device 211a is the source storage device and storage device 211b and storage device 211c are target storage devices. As shall be explained in greater detail, the approach reduces network load, particularly on networks connections for the storage device client. However, the approach may increase replicated write latency. The approach follows the below sequence of operations.

1. Storage device client 202 sends a write request to write a data block, transmitting the primary data block address and data block to storage device 211a.

2. Storage device 211a transmits an acknowledgement to acknowledge that write of the data block.

3. In response to receiving the acknowledgement from storage device 211a, storage device client 202 sends write by-peer-reference requests to each of storage device 211b and storage device 211c, each write by-peer-reference request specifying a target primary block address, storage device 211a as the source storage device, and a source primary block address for the source data block. Each of storage device 211b and storage device 211c issues a read request for the source data block to storage device 211a and writes the source data block at the specified target primary block address once received from storage device 211a.

4. After writing the source data block, each of storage device 211b and storage device 211c transmits an acknowledgement to storage device 211a to acknowledge writing the source data block.

5. Once an acknowledgement acknowledging the write of the source data block is received from each of storage device 211b and storage device 211c, the write of the data block to Storage System 201 is considered committed.

The above approach may increase latency for replicated writes as compared to an approach for replicated writes that issues concurrent write requests and transmits data blocks to all mirror peers. In the above approach, transmission of the write by-peer-reference is delayed by completion of the initial write request to the first mirror peer. However, the approach reduces network usage between a storage device client and storage devices. While the number of write requests transmitted between the storage device client and storage devices may be the same, the amount of data transmitted between the storage device client and storage devices is reduced. Only one write request need entail transmission of a data block between the storage device client and a storage device. Other write requests may be write by-peer-reference requests, which do not entail transmission of the data block from the storage device client. Overall storage system performance is improved and may even offset or perhaps even reduce the latency.

Pinning a Source Data Block

In an embodiment, the write request to the source storage device may specify the number of read requests that the target storage devices will transmit to read the source data block. The source storage device may use this number to "pin" the source data block in the fast cache, that is, retain the data block in the fast cache until the target storage devices read requests are received and serviced. Once the number of read requests from the target peers for the source data block are received and serviced, the source data block may no longer be retained in fast memory.

In the current illustration, when storage device client 202 sends the write request to storage device 211a to write the source data block, the write request specifies that the expected read requests for the source data block is two. The source data block is stored in the fast cache and stored persistently in persistent cache or primary storage. Storage device 211a associates a counter ("expected-reads counter") with the source data block, the counter being set to two. As read requests from storage device 211b and storage device 211c for the source data block are received and serviced by storage device 211a, the expected-reads counter is decremented. Once the expected-reads counter indicates the two requests from storage device 211b and storage device 211c have been received, the source data block may no longer be retained in fast cache.

The cache-hit management policy applied by storage device client 202 may account for the expected-reads counter associated with a source block in deciding whether to retain a source data block. The cache-hit management policy may simply forego removing the source data block until the expected read counter reaches 0, or give higher priority to retaining the source data block while the expected read counter is nonzero. In an embodiment, a source data block may be also pinned in a similar manner in a persistent cache of a storage device.

EMBODIMENT TO ILLUSTRATE FURTHER OPTIMIZATIONS

Further optimizations and aspects of embodiments of the present invention are described below. To explain and illustrate the further optimizations and aspects, it is useful to describe other features of data mirroring which may be used to implement an embodiment of the present invention.

Figure 4:
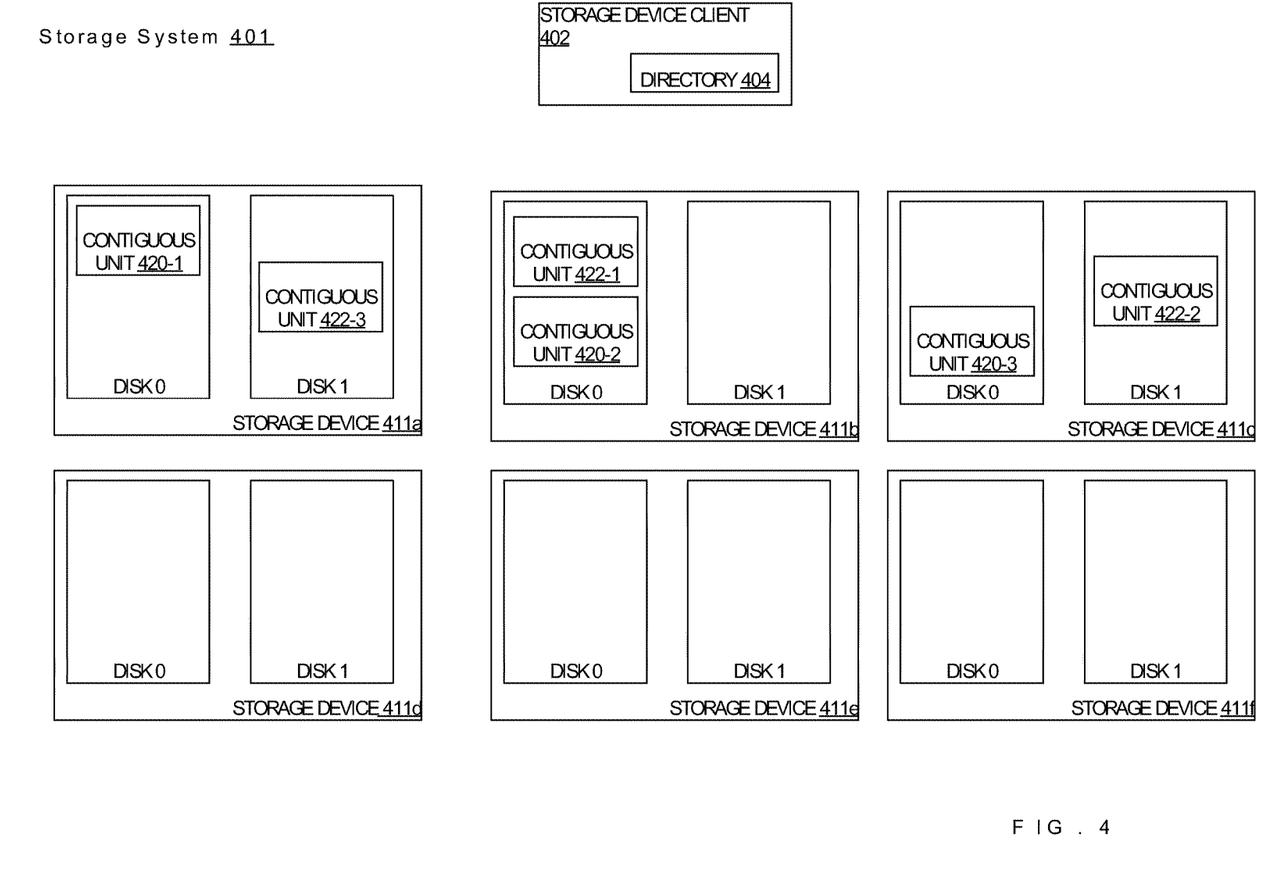
FIG. 4 is a drawing depicting a storage system according to an embodiment of the present invention.

Referring to FIG. 4, it depicts Storage System 401. Storage System 401 comprises storage device 411a, storage device 411b, storage device 411c, storage device 411d, storage device 411e, and storage device 411f. Each of storage device 411a, storage device 411b, storage device 4c, storage device 411d, storage device 411e, and storage device 411f has a disk drive labeled disk 0 and disk 1 as depicted in FIG. 4, though each may have more disk drives, or just one.

In Storage System 401, data blocks are mirrored using contiguous unit mirroring. A contiguous unit comprises a contiguous sequence of data blocks in a storage media device, such as a disk drive or flash memory device. Under contiguous unit mirroring, the data blocks of a contiguous unit are mirrored with one or more other contiguous units, each of which is on a separate storage media device, which may be in separate mirror. A set of contiguous units that are mirrored with each other is referred to herein as a mirrored unit group. The contiguous units of a mirror unit group may store the same number of data blocks. In an embodiment, copies of a data block are stored in the same sequential order within the sequence of contiguous data blocks.

Each mirrored unit group includes a primary contiguous unit and a secondary contiguous unit, and possibly a tertiary contiguous unit or more. The greater the number of contiguous units in a mirrored unit group, the greater is the redundancy. With respect to a primary contiguous unit or a data block stored in the contiguous unit, the storage device that holds the primary contiguous unit is referred to as the primary storage device or primary mirror peer. With respect to a secondary contiguous unit or data block stored in the secondary contiguous unit, the storage device that holds the secondary contiguous unit is referred to as the secondary storage device or secondary mirror peer, and so forth.

In an embodiment, when a storage device client issues a read request for a data block, the storage device client first issues a read request to the primary storage device for the data block, if the primary storage device is online. Alternatively, if the read request is not successful, or if the primary storage device is offline, the storage client issues a read request to the secondary storage device for the data block.

Referring to FIG. 4, contiguous unit 420-1, contiguous unit 420-2, and contiguous unit 420-3 comprise a mirrored unit group. Contiguous unit 420-1 is the primary contiguous unit and therefore storage device 411a is the primary storage device for the mirrored unit group and the data blocks held therein; storage device 411b is the secondary storage device and storage device 411c is the tertiary storage device. Storage device 411a, storage device 411b, and storage device 411c are mirror peers for the data blocks in the mirror unit group.

Contiguous unit 422-1, contiguous unit 422-2, contiguous unit 422-3 comprise another mirrored unit group. Contiguous unit 422-1 is the primary contiguous unit and therefore storage device 411b is the primary storage device for the mirrored unit group and the data blocks held therein; storage device 411c is the secondary storage device and storage device 411a is the tertiary storage device.

Directory

Contiguous units of a mirrored unit group do not have to be stored at the same addresses of the respective storage media devices that hold the mirrored unit group. The address range at which contiguous unit 420-1 is stored in disk 0 of storage device 411a is different than the address range at which contiguous unit 420-2 is stored in disk 0 of storage device 411b. Similarly, the address range at which contiguous unit 422-1 is stored in disk 0 of storage device 411b is different than the address range at which contiguous unit 422-2 is stored in disk 1 of storage device 411c.

As a consequence, the primary block addresses of the copies of a data block within a mirrored unit group differ. Thus, in a write by-peer-reference, at least the part of a target primary block address and source primary block address that corresponds to the address range within a storage media device may differ. For example, for a data block in contiguous unit 420-1, the primary block address may be "Disk 1:Address 0001", while a copy of the data block in contiguous unit 420-2, the primary block address is "Disk 1:Address 7987".

To determine and track the primary block address of a data block on each storage device of a mirrored set for the data block, a storage device client maintains a directory. In FIG. 4, storage device client 402 maintains directory 404.

For a mirrored unit group, a directory maps the primary contiguous unit to the primary storage device and to the primary block address at which storage of the primary contiguous unit begins, and maps the secondary contiguous unit to the secondary storage device and the secondary block address at which storage of the secondary contiguous unit begins, and so forth. The primary block address for a data block in a contiguous unit on a particular storage device can be resolved using the primary block address to which the contiguous unit is mapped by the directory and the order of the data block within the sequence of data blocks in the contiguous unit.

Load and Rebalancing

In general, because reads for data blocks in a mirrored unit group are directed to the primary storage device, the primary storage device experiences the greats I/O load for the mirrored unit group. Thus, the placement of primary contiguous units within a storage system is an important factor that affects the distribution of load between the storage devices in a mirrored storage system.

According to an embodiment, rebalancing transfers contiguous units between storage devices to balance or otherwise re-distribute I/O load. The contiguous units may be transferred between storage devices using write by-peer-reference. For example, to lessen the load on storage device 411b, contiguous unit 422-1, the primary contiguous unit, may be transferred to disk 1 of storage device 411c. Before transferring the primary contiguous unit 422-1, the corresponding secondary contiguous unit 422-1 is first transferred to storage device 411d, disk 1.

Preserving Cache Properties

When a source storage device receives a request for a source data block, the source data block ("cached source data block") may be in the persistent cache of the source storage device. In general, the cached source data block is being retained in the persistent cache because of the relative higher likelihood of imminent future access, a likelihood that may follow the source data block to the target storage device once transmitted. For a cached source data block, the benefit of caching the source data block can be preserved by caching the source data block in the persistent cache of the target storage device.

Whether the benefit of cache retention follows the source data block to the target data block may depend on the type of operation for which a write by-peer-reference is being performed. For example, when transferring a cached source data block of a primary contiguous unit to another storage device as part of rebalancing, it is more likely that the benefit of cache retention for the source data block follows the source data block to the target storage device because the primary target storage device will become the primary storage device for the contiguous unit. On the other hand, when transferring a cached source data block of a secondary contiguous unit to another storage device as part of rebalancing, it is very unlikely that the benefit of cache retention for the source data block follows the source data block to the target storage device.

In general, a target storage device is unaware of the type of operation for which the write by-peer-reference is being requested, and is therefore unable to determine the benefit of cache retention for a source data block.

According to an embodiment of the present invention, a write by-peer-reference request may specify to attempt to preserve a cached property of a source data block at a target storage device. If a write by-peer-reference specifies to preserve a cached property of a source data block, then the when the target storage device writes the source data block, it may cache the source data block in a cache of the target storage device according to the write by-peer-reference request.

For example, contiguous unit 420-1 is being transferred from storage device 411a to storage device 411d as part of a rebalancing using write by-peer-reference. Storage device client 402 sends a write by-peer-reference request to storage device 411d to write a source data block from contiguous unit 420-1, specifying to preserve the cached property of the source data block. Storage device 411d transmits a read request to storage device 411a to retrieve the source data block. The read request specifies to return the cached property of the source data block along with the source data block.

In response to the read request from storage device 211c, storage device 211b determines that the storage device 211b has requested the cached property of the source data block. In response to the determination, storage device 211b transmits the source data block and data indicating that the cached property of the source data block is that the source data block is cached in persistent cache.

Storage device 211c receives the source date block and the indication of the cached property. In response, storage device 211c caches the source data block in the persistent cache of storage device 211c. The source data block may also be written to primary storage.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
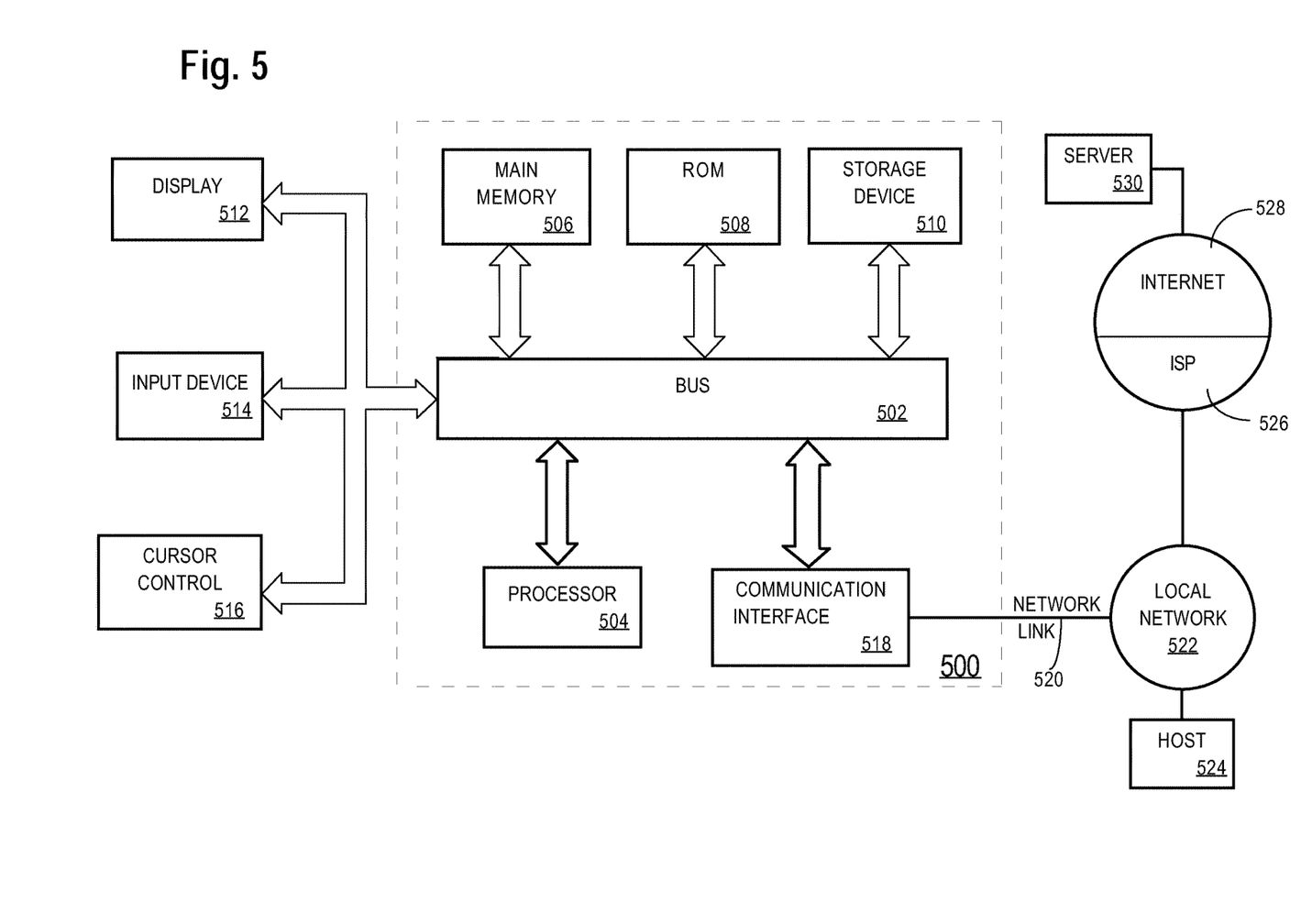
FIG. 5 depicts a computer system that may be used to implement an embodiment of the present invention.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising steps of:
   a storage device client writing a data block to a target storage device of a mirrored storage system, wherein writing said data block comprises:

sending a write request to said target storage device of said mirrored storage system, said write request specifying:
  a source storage device in said mirror storage system,
  a source primary block address of said data block at said source storage device, and
  a target primary block address to which to write said data block at said target storage device;
in response to receiving said write request, said target storage device transmitting a read request for said data block to said source storage device, said read request specifying said source primary block address;
in response to receiving said read request, said source storage device transmitting said data block to said target storage device;
said target storage device writing said data block at the target primary block address; and
after said target storage device writing said data block at the target primary block address, said target storage device transmitting an acknowledgement to said storage device client acknowledging writing said data block at said target storage device.

2. The method of claim 1 wherein:
said write request to said target storage device specifies to preserve a cache property of said data block at the source storage device;
said read request for said data block to said source storage device requests said cache property; and
the method further includes retaining said data block in a cache after writing said data block to primary storage in response to said write request specifying to preserve said cache property.

3. The method of claim 1, wherein said target primary block address and source primary block address are different.

4. The method claim 1, wherein:
a copy of said data block is stored in a contiguous set of data blocks stored in said target storage device;
a copy of said data block is stored in a contiguous set of data blocks stored in said source storage device;
a directory stored in said storage device client maps the contiguous set of data blocks stored in said target storage device to a storage location on said target storage device;
said directory stored in said storage device client maps the contiguous set of data blocks stored in said source storage device to a storage location on said source storage device; and
the method further includes the storage device client determining based on the directory the source primary block address and target primary block address.

5. A method, comprising steps of:
a storage device client writing a data block to a mirrored storage system, wherein writing said data block to said mirrored storage system comprises:
  sending a first write request to a source mirror peer of said mirrored storage system, said sending a first write request including said storage device client transmitting said data block to said source mirror peer;
  said source mirror peer transmitting to said storage device client an acknowledgement to acknowledge writing said data block at said source mirror peer;
  in response to said storage device client receiving said acknowledgement from said source mirror peer, said storage device client sending a second write request to a target mirror peer of said mirrored storage system, said second write request specifying:
    said source mirror peer in said mirror storage system,
    a source primary block address of said data block at said source mirror peer, and
    a target primary block address to which to write said data block at said target mirror peer; and
  in response to receiving said second write request:
    said target mirror peer transmitting a read request for said data block to said source mirror peer, said read request specifying said source primary block address, and
    in response to receiving said read request, said source mirror peer transmitting said data block to said target mirror peer;
  in response to receiving said data block from said source mirror peer, said target mirror peer writing said data block at the target primary block address; and
  after said target mirror peer said writing said data block at the target primary block address, said target mirror peer transmitting an acknowledgement to said storage device client acknowledging writing said data block at said target mirror peer.

6. The method claim 5, wherein:
a copy of said data block is stored in a contiguous set of data blocks stored in said target mirror peer;
a copy of said data block is stored in a contiguous set of data blocks stored in said target mirror peer;
a directory stored in said storage device client maps the contiguous set of data blocks stored in said target mirror peer to a storage location on said target mirror peer;
said directory stored in said storage device client maps the contiguous set of data blocks stored in said source mirror peer to a storage location on said source mirror peer; and
the method further includes the storage device client determining that the source primary block address and target primary block address based on the directory.

7. The method of claim 6, wherein said target primary block address and source primary block address are not the same.

8. A storage system, comprising:
a storage device client configured to write a data block to a target storage device of a mirrored storage system, by being configured to:
  send a write request to said target storage device of said mirrored storage system, said write request specifying:
    a source storage device in said mirror storage system,
    a source primary block address of said data block at said source storage device, and
    a target primary block address to which to write said data block at said target storage device;
said target storage device being configured to, in response to receipt of said write request, transmit a read request for said data block to said source storage device, said read request specifying said source primary block address;
said source storage device being configured to, in response to receipt of said read request, transmit said data block to said target storage device;
said target storage device being configured to write said data block at the target primary block address; and said target storage device being configured to, after said target storage device writes said data block at the target primary block address, transmit an acknowledgement to said storage device client acknowledging writing said data block at said target storage device.

9. The storage system of claim 8 wherein:
said write request to said target storage device specifies to preserve a cache property of said data block at the source storage device;
said read request for said data block to said source storage device requests said cache property; and
the system is further configured to retain said data block in a cache after writing said data block to primary storage.

10. The storage system of claim 8, wherein said target primary block address and source primary block address are different.

11. The storage system of claim 8, wherein:
a copy of said data block is stored in a contiguous set of data blocks stored in said target storage device;
a copy of said data block is stored in a contiguous set of data blocks stored in said source storage device;
a directory stored in said storage device client maps the contiguous set of data blocks stored in said target storage device to a storage location on said target storage device;
said directory stored in said storage device client maps the contiguous set of data blocks stored in said source storage device to a storage location on said source storage device; and
the storage device client is further configured to determine, based on the directory, the source primary block address and target primary block address.

12. A storage system, comprising:
a storage device client configured to write a data block to a mirrored storage system, by being configured to:
send a first write request to a source mirror peer of said mirrored storage system, wherein to send said first write request includes said storage device client transmitting said data block to said source mirror peer;
said source mirror peer being configured to transmit to said storage device client an acknowledgement to acknowledge writing said data block at said source mirror peer;
said storage device client being configured to, in response to receipt of said acknowledgement from said source mirror peer, send a second write request to a target mirror peer of said mirrored storage system, said second write request specifying:
said source mirror peer in said mirror storage system,
a source primary block address of said data block at said source mirror peer, and
a target primary block address to which to write said data block at said target mirror peer; and
in response to receipt of said second write request:
said target mirror peer being configured to transmit a read request for said data block to said source mirror peer, said read request specifying said source primary block address, and
said source mirror peer being configured to, in response to receipt of said read request, transmit said data block to said target mirror peer;
said target mirror peer being configured to, in response to receipt of said data block from said source mirror peer, write said data block at the target primary block address; and
said target mirror peer being configured to, after said target mirror peer said writing said data block at the target primary block address, transmit an acknowledgement to said storage device client acknowledging writing said data block at said target mirror peer.

13. The storage system of claim 12, wherein:
a copy of said data block is stored in a contiguous set of data blocks stored in said target mirror peer;
a copy of said data block is stored in a contiguous set of data blocks stored in said target mirror peer;
a directory stored in said storage device client maps the contiguous set of data blocks stored in said target mirror peer to a storage location on said target mirror peer;
said directory stored in said storage device client maps the contiguous set of data blocks stored in said source mirror peer to a storage location on said source mirror peer; and
the storage device client is further configured to determine the source primary block address and target primary block address based on the directory.

14. The storage system of claim 13, wherein said target primary block address and source primary block address are not the same.

15. One or more non-transitory storage media storing instructions which, when executed by one or more processors, cause:
a storage device client writing a data block to a target storage device of a mirrored storage system, wherein writing said data block comprises:
sending a write request to said target storage device of said mirrored storage system, said write request specifying:
a source storage device in said mirror storage system,
a source primary block address of said data block at said source storage device, and
a target primary block address to which to write said data block at said target storage device;
in response to receiving said write request, said target storage device transmitting a read request for said data block to said source storage device, said read request specifying said source primary block address;
in response to receiving said read request, said source storage device transmitting said data block to said target storage device;
said target storage device writing said data block at the target primary block address; and
after said target storage device writing said data block at the target primary block address, said target storage device transmitting an acknowledgement to said storage device client acknowledging writing said data block at said target storage device.

16. The one or more non-transitory storage media of claim 15 wherein:
said write request to said target storage device specifies to preserve a cache property of said data block at the source storage device;
said read request for said data block to said source storage device requests said cache property; and
the instructions further including instructions that, when executed by said one or more processors, cause retaining said data block in a cache after writing said data block to primary storage in response to said write request specifying to preserve said cache property.

17. The one or more non-transitory storage media of claim 15, wherein said target primary block address and source primary block address are different.

18. The one or more non-transitory storage media claim 15, wherein:
- a copy of said data block is stored in a contiguous set of data blocks stored in said target storage device;
- a copy of said data block is stored in a contiguous set of data blocks stored in said source storage device;
- a directory stored in said storage device client maps the contiguous set of data blocks stored in said target storage device to a storage location on said target storage device;
- said directory stored in said storage device client maps the contiguous set of data blocks stored in said source storage device to a storage location on said source storage device; and
- the instructions further including instructions that, when executed by said one or more processors, cause the storage device client determining based on the directory the source primary block address and target primary block address.

19. One or more non-transitory storage media storing instructions which, when executed by one or more processors, cause: a storage device client writing a data block to a mirrored storage system, wherein writing said data block to said mirrored storage system comprises: sending a first write request to a source mirror peer of said mirrored storage system, said sending first write request including said storage device client transmitting said data block to said source mirror peer; said source mirror peer transmitting to said storage device client an acknowledgement to acknowledge writing said data block at said source mirror peer; in response to said storage device client receiving said acknowledgement from said source mirror peer, said storage device client sending a second write request to a target mirror peer of said mirrored storage system, said second write request specifying: said source mirror peer in said mirror storage system, a source primary block address of said data block at said source mirror peer, and a target primary block address to which to write said data block at said target mirror peer; and in response to receiving said second write request: said target mirror peer transmitting a read request for said data block to said source mirror peer, said read request specifying said source primary block address, and in response to receiving said read request, said source mirror peer transmitting said data block to said target mirror peer; in response to receiving said data block from said source mirror peer, said target mirror peer writing said data block at the target primary block address; and after said target mirror peer writing said data block at the target primary block address, said target mirror peer transmitting an acknowledgement to said storage device client acknowledging writing said data block at said target mirror peer.

20. The one or more non-transitory storage media claim 19, wherein:
- a copy of said data block is stored in a contiguous set of data blocks stored in said target mirror peer;
- a copy of said data block is stored in a contiguous set of data blocks stored in said target mirror peer;
- a directory stored in said storage device client maps the contiguous set of data blocks stored in said target mirror peer to a storage location on said target mirror peer;
- said directory stored in said storage device client maps the contiguous set of data blocks stored in said source mirror peer to a storage location on said source mirror peer; and
- the instructions further including instructions that, when executed by said one or more processors, cause the storage device client determining that the source primary block address and target primary block address based on the directory.

21. The one or more non-transitory storage media of claim 20, wherein said target primary block address and source primary block address are not the same.

* * * * *